(12) United States Patent  
Rieger et al.

(10) Patent No.: US 8,490,032 B2
(45) Date of Patent: Jul. 16, 2013

(54) FLASH-BASED ANTI-ALIASING TECHNIQUES FOR HIGH-ACCURACY HIGH-EFFICIENCY MASK SYNTHESIS

(75) Inventors: Michael L. Rieger, Skamania, WA (US); Micheal Cranford, Hillsboro, OR (US); John P. Stirniman, Vancouver, WA (US)

(73) Assignee: Synopsys, Inc., Mountain View, CA (US)

( * ) Notice: Subject to any disclaimer, the term of this patent is extended or adjusted under 35 U.S.C. 154(b) by 491 days.

(21) Appl. No.: 12/892,772

(22) Filed: Sep. 28, 2010

(65) Prior Publication Data

US 2011/0016438 A1 Jan. 20, 2011

Related U.S. Application Data

(62) Division of application No. 11/861,195, filed on Sep. 25, 2007, now Pat. No. 7,831,954.

(51) Int. Cl.
*G06F 17/50* (2006.01)
*G03F 1/00* (2012.01)

(52) U.S. Cl.
USPC ............ 716/54; 716/50; 716/51; 716/52; 716/53; 716/55; 716/56; 430/5

(58) Field of Classification Search
USPC ................................ 716/50–56, 132; 430/5
See application file for complete search history.

(56) References Cited

U.S. PATENT DOCUMENTS

| | | | |
|---|---|---|---|
| 6,081,658 A * | 6/2000 | Rieger et al. | 716/52 |
| 6,081,685 A | 6/2000 | Umetani | |
| 6,223,139 B1 * | 4/2001 | Wong et al. | 703/5 |
| 6,289,499 B1 | 9/2001 | Rieger | |
| 6,738,859 B2 * | 5/2004 | Liebchen | 716/51 |
| 6,904,587 B2 * | 6/2005 | Tsai et al. | 716/52 |
| 7,272,530 B2 * | 9/2007 | Hsiung et al. | 702/182 |
| 7,378,202 B2 * | 5/2008 | Granik et al. | 430/30 |
| 7,398,508 B2 * | 7/2008 | Shi et al. | 716/52 |
| 7,512,926 B2 * | 3/2009 | Hu et al. | 716/50 |
| 7,562,319 B2 * | 7/2009 | Pierrat et al. | 716/53 |
| 7,617,478 B2 * | 11/2009 | Rieger et al. | 716/51 |
| 7,627,837 B2 * | 12/2009 | Zhang | 716/53 |
| 7,849,423 B1 * | 12/2010 | Yenikaya et al. | 716/132 |
| 7,856,612 B1 * | 12/2010 | Ungar et al. | 716/55 |
| 7,873,204 B2 * | 1/2011 | Wihl et al. | 382/144 |
| 2007/0162888 A1 * | 7/2007 | Melvin, III et al. | 716/21 |
| 2008/0219590 A1 * | 9/2008 | Li et al. | 382/279 |
| 2008/0235651 A1 * | 9/2008 | Li et al. | 716/21 |

* cited by examiner

Primary Examiner — Helen Rossoshek
(74) Attorney, Agent, or Firm — Park, Vaughan, Fleming & Dowler, LLP; Fang Chen

(57) ABSTRACT

Techniques and systems for converting a non-bandlimited pattern layout into a band-limited pattern image are described. During operation, the system receives the non-bandlimited pattern layout which comprises one or more polygons. The system further receives an anti-aliasing filter (AAF) kernel, wherein the AAF kernel is configured to convert a non-bandlimited pattern into a band-limited pattern. The system then constructs an AAF lookup table for the AAF kernel, wherein the AAF lookup table contains precomputed values for a set of convolution functions which are obtained by convolving a set of basis functions with the AAF kernel. Next, the system creates a sampled pattern layout by applying a grid map over the pattern layout. The system then obtains the band-limited pattern image by using the AAF lookup table to convolve the AAF kernel with each grid location in the sampled pattern layout.

18 Claims, 9 Drawing Sheets

FLASH-BASED ANTI-ALIASING TECHNIQUES FOR HIGH-ACCURACY HIGH-EFFICIENCY MASK SYNTHESIS

RELATED APPLICATION

This application is a divisional of, and claims priority to, U.S. application Ser. No. 11/861,195, entitled "FLASH-BASED UPDATING TECHNIQUES FOR HIGH-ACCURACY HIGH-EFFICIENCY MASK SYNTHESIS," by the same inventors, filed 25 Sep. 2007.

BACKGROUND

1. Field of the Invention

The present invention generally relates to the process of semiconductor manufacturing. More specifically, the present invention relates to flash-based techniques for performing high-accuracy, high-efficiency mask pattern synthesis for a semiconductor manufacturing process.

2. Related Art

Dramatic improvements in semiconductor integration circuit (IC) technology presently make it possible to integrate hundreds of millions of transistors onto a single semiconductor IC chip. These improvements in integration densities have largely been achieved through corresponding improvements in semiconductor manufacturing technologies. Semiconductor manufacturing technologies typically include a number of processes which involve complex physical and chemical interactions. Since it is almost impossible to find exact formulae to predict the behavior of these complex interactions, developers typically use process models which are fit to empirical data to predict the behavior of these processes. In particular, various process models have been integrated into Optical Proximity Correction (OPC)/Resolution Enhancement Technologies (RET) for enhancing imaging resolutions during optical lithographic processes.

More specifically, during an OPC/RET simulation process, one or more process models are used to make corrections to a semiconductor chip layout in a mask to compensate for the undesirable effects of complex lithographic processes. An OPC/RET model ("OPC model" hereafter) is typically composed of a physical optical model and an empirical process model. An OPC simulation engine uses the OPC model to iteratively evaluate and modify edge segments in the mask layout. In doing so, the OPC simulation engine computes the correct mask patterns which produce physical patterns on a wafer that closely match a desired design layout.

Note that the physical process of a pattern image transferring through an optical lithography system onto a wafer can be modeled by convolving the pattern layout with a sequence of lithography system models (i.e., lithography model kernels). In practice, an input pattern layout is typically sampled at specific locations and the resulting physical image is only evaluated at those sampled locations (particularly on or proximate to the pattern boundaries). Consequently, most model-based OPC engines and other physical verification tools require computational methods to perform numerical convolutions.

Previously, a pattern layout was typically sampled "sparsely" with only a few evaluation points on the edges of a design feature. Hence, prior art model-based OPC tools were generally designed to perform "sparse" numerical convolutions with high efficiency. One type of "sparse" convolution technique (referred to as a "flash"-based technique) involves precomputing convolution values for a set of geometric primitives and storing the precomputed values in lookup tables. For example, this flash-based technique is described in "Proximity Correction Software for Wafer Lithography," U.S. Pat. No. 6,289,499 and in "Proximity Correction System for Wafer Lithography," U.S. Pat. No. 6,081,685, both by inventors Michael L. Rieger and John P. Stirniman. Note that for sparse simulations, a flash-based technique can be significantly more efficient than a DFT-based (discrete Fourier transform) convolution technique, such as using fast Fourier transforms (FFTs). (We refer to a model-based OPC technique that uses a flash-based convolution method as a "flash-based OPC" technique.)

However, the number of sampling points (i.e., the density of the sampling grid) has been increasing rapidly. This is because designers have become increasingly more interested in getting simulation results at locations other than just from the edges. For example, a simulation which uses a high-density sampling grid can be used to compute slopes and detect side-lobe printing problems.

A field-based OPC simulation technique is a dense pixel-based OPC technique that provides computational efficiencies when a larger number of model evaluation locations are needed, and when the simulation layout geometry is complex. More specifically, a field-based OPC simulation technique first establishes a uniform grid of simulation points, or pixels, for an entire region of interest (typically a square area between 40 mm and 100 mm), wherein the grid spacing is determined by the spatial bandwidth required by the OPC model. Note that when the Nyquist criterion is used to establish the grid spacing, the sample array completely describes the band-limited system, and any off-grid point can be accurately calculated with appropriate interpolation methods. The field-based OPC simulation technique then computes results, in one operation, for the entire grid of simulation points. In particular, this can involve computing numerical convolutions in the frequency domain using a DFT-based technique.

Unfortunately, adopting a DFT-based technique to perform an OPC simulation is problematic because the pattern layout is non-bandlimited. More specifically, mask patterns are represented by polygons, which are mathematically represented by two-dimensional (2D) functions of surfaces. When the polygon functions are directly sampled, arrays of ones and zeros are created, which contain frequencies well above the band-limit required by the DFT engine. Hence, prior to sending the sampled data to the DFT engine, it is necessary to convert a non-bandlimited signal (i.e., the pattern layout) into a band-limited one which is required by the DFT engine.

Typically, this conversion can be performed by filtering the pattern layout using an anti-aliasing (AA) filter, which also involves a convolution operation. Because the DFT engine requires band-limited input, it cannot be used for this operation. One technique for performing the filtering operation is referred to as "subresolution-pixel" or "sub-pixel" sampling (SPS), wherein an input image is first rendered into a high-density pixel grid, which is subsequently converted to a desired lower resolution grid by sampling with a finite impulse response (FIR) filter. Note that the SPS technique is a general image processing technique, which is often used for creating visually pleasing computer graphic display images. However, the alias-noise suppression level (typically less than 1 part in 1000) required for lithography simulation would require a very fine sub-sample grid, thus making the SPS technique computationally expensive for this application.

Hence, what is needed is a method and an apparatus for converting a non-bandlimited pattern layout into a band-limited pattern image without the above-described problems.

SUMMARY

One embodiment of the present invention provides a system that converts a non-bandlimited pattern layout into a band-limited pattern image to facilitate simulating an optical lithography process. During operation, the system receives the non-bandlimited pattern layout which comprises one or more polygons. The system further receives an anti-aliasing filter (AAF) kernel, wherein the AAF kernel is configured to convert a non-bandlimited pattern into a band-limited pattern. The system then constructs an AAF lookup table for the AAF kernel, wherein the AAF lookup table contains precomputed values for a set of convolution functions which are obtained by convolving a set of basis functions with the AAF kernel. Next, the system creates a sampled pattern layout by applying a grid map over the pattern layout. The system then obtains the band-limited pattern image by using the AAF lookup table to convolve the AAF kernel with each grid location in the sampled pattern layout.

In a variation on this embodiment, prior to constructing the AAF lookup table, the system identifies the set of basis functions as a set of half-plane basis functions, wherein each of the half-plane basis functions corresponds to each of a set of predetermined face angles.

In a further variation on this embodiment, the system decomposes each of the one or more polygons into a combination of basis functions from the set of basis functions.

In a further variation on this embodiment, the system constructs the AAF lookup table by: convolving the set of basis functions with the AAF kernel to obtain the set of convolution functions; obtaining the precomputed values by sampling the convolution functions over a sampling grid; and storing the precomputed values in the AAF lookup table.

In a further variation on this embodiment, the system uses the AAF lookup table to convolve the AAF kernel with each grid location in the sampled pattern layout. Specifically, the system determines if the grid location is associated with one of the polygons. If so, the system decomposes the associated polygon into a set of flashes, wherein each flash is an instance of one of the set of basis functions. For the grid location, the system then retrieves a corresponding precomputed value in the AAF lookup table for each flash in the set of flashes. Next, the system sums together the set of retrieved precomputed values to obtain a convolution value at the grid location.

In a further variation, if the grid location does not match the locations of the precomputed values, the system interpolates a value for the grid location based on the precomputed values in the vicinity of the grid location.

In a further variation, a subset of flashes in the set of flashed can be associated with the same basis function but different weights and different offsets.

In a variation on this embodiment, the AAF lookup table is a two-dimensional table indexed by x and y coordinates.

In a variation on this embodiment, the system convolves the band-limited pattern image with a set of lithography model kernels in the spatial frequency domain.

In a variation on this embodiment, the system performs a discrete Fourier transform (DFT) on the band-limited pattern image prior to performing convolution in the spatial frequency domain.

In a further variation on this embodiment, the system performs the DFT by performing a fast Fourier transform (FFT).

Another embodiment of the present invention provides a system that computes the effect of perturbations to an input pattern layout during an OPC (Optical Proximity Correction) process. During operation, the system receives a pattern layout. The system further receives a set of lithography model kernels. The system then obtains a set of convolved patterns by convolving the pattern layout with each of the set of lithography model kernels. Next, the system computes a model flash lookup table for each of the lithography model kernels, wherein the model flash lookup table contains precomputed values for a set of convolution functions obtained by convolving a set of basis functions with the lithography model kernel. The system additionally receives a perturbation pattern to be added onto the pattern layout. Next, for a query location in a plurality of query locations on the pattern layout, the system obtains a set of convolution values at the query location by using the model flash lookup tables to convolve the perturbation pattern with the set of lithography model kernels. The system then updates the set of convolved patterns at the query location to account for the effect of the perturbation pattern by combining the set of convolution values with the set of convolved patterns. Next, the system computes an intensity value at the query location.

In a variation on this embodiment, prior to constructing the model flash lookup table, the system identifies the set of basis functions as a set of half-plane basis functions, wherein each of the half-plane basis functions corresponds to each of a set of predetermined face angles.

In a further variation on this embodiment, the system constructs the model flash lookup table by: convolving the set of basis functions with the lithography model kernel to obtain the set of convolution functions; obtaining the precomputed values by sampling the convolution functions over a sampling grid; and storing the precomputed values in the model flash lookup table.

In a further variation on this embodiment, the system uses the model flash lookup tables to convolve the perturbation pattern with the set of lithography model kernels. Specifically, the system decomposes the perturbation pattern into a set of flashes, wherein each flash is an instance of one of the set of basis functions. Next, for each lithography model kernel, the system retrieves a corresponding precomputed value for the query location in the corresponding model flash lookup table for each flash in the set of flashes. The system then sums together the set of retrieved precomputed values to obtain a convolution value at the query location.

In a further variation, the system interpolates a value for the query location based on the precomputed values in the vicinity of the query location if the query location does not match the locations of the precomputed values in the corresponding model flash lookup table.

In a variation on this embodiment, the system combines the set of convolution values with the set of convolved patterns by adding each convolution value to a value in each corresponding convolved pattern at the query location.

In a variation on this embodiment, system computes the intensity value at the query location by summing the squares of the set of updated convolved patterns at the query location.

In a variation on this embodiment, the system compares the computed intensity value with a threshold value. If the computed intensity value is below the threshold value, the system changes the perturbation pattern. The system then recomputes the set of convolution values. The system next updates the set of convolved patterns at the query location based on the recomputed set of convolution values. Next, the system recomputes the intensity value at the query location. Note that recomputing the intensity value does not require recomputing the convolved patterns.

In a further variation on this embodiment, the system performs the above operation in an iteration loop to achieve a desired intensity value.

In a variation on this embodiment, the model flash lookup table is a two-dimensional table indexed by x and y coordinates.

In a variation on this embodiment, the system convolves the pattern layout with each of the set of lithography model kernels in the spatial frequency domain.

In a further variation on this embodiment, the system performs a discrete Fourier transform (DFT) on the pattern layout prior to performing the convolution in the spatial frequency domain.

In a further variation, the system performs the DFT by performing a fast Fourier transform (FFT).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Integrated Circuit Design Flow

Figure 1:
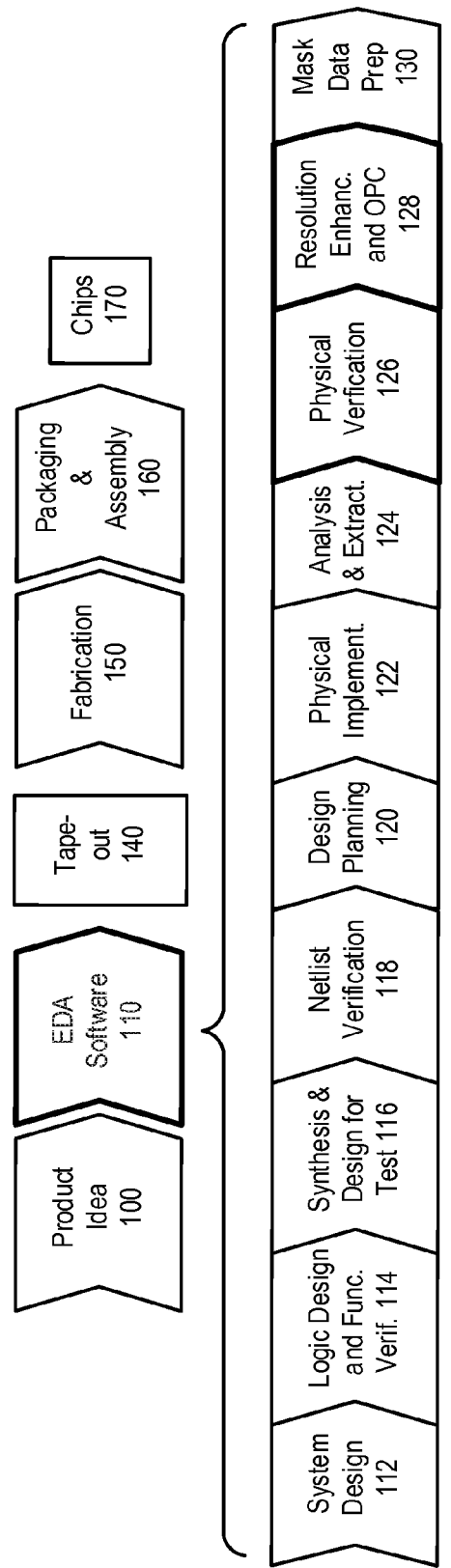
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention.

The process starts with the product idea (step 100) which is realized using an EDA software design process (step 110). When the design is finalized, it can be taped-out (event 140). After tape out, the fabrication process (step 150) and packaging and assembly processes (step 160) are performed which ultimately result in finished chips (result 170).

The EDA software design process (step 110), in turn, comprises steps 112-130, which are described below. Note that the design flow description is for illustration purposes only. This description is not meant to limit the present invention. For example, an actual integrated circuit design may require the designer to perform the design steps in a different sequence than the sequence described below. The following discussion provides further details of the steps in the design process.

System design (step 112): The designers describe the functionality that they want to implement. They can also perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, tests can be designed and implemented to check the finished chips. Exemplary EDA software products from Synopsys, Inc. that can be used at this step include Design Compiler®, Physical Compiler, Test Compiler, Power Compiler, FPGA Compiler, Tetramax, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products.

Analysis and extraction (step 124): At this step, the circuit function is verified at a transistor level; this in turn permits what-if refinement. Exemplary EDA software products from Synopsys, Inc. that can be used at this step include AstroRail, PrimeRail, Primetime, and Star RC/XT products.

Physical verification (step 126): In this step, the design is checked to ensure correctness for manufacturing, electrical issues, lithographic issues, and circuitry. Exemplary EDA software products from Synopsys, Inc. that can be used at this step include the Hercules product.

Resolution enhancement and Optical Proximity Correction (OPC) (step 128): This step involves geometric manipulations of the layout to improve manufacturability of the design. Exemplary EDA software products from Synopsys, Inc. that can be used at this step include Progen, Proteus, ProteusAF, and PSMGen products.

Mask data preparation (step 130): This step provides the "tape-out" data for production of masks to produce finished chips. Exemplary EDA software products from Synopsys, Inc. that can be used at this step include the CATS(R) family of products.

Embodiments of the present invention can be used during one or more of the above-described steps. Specifically, one embodiment of the present invention can be used during physical verification step 126 and resolution enhancement step 128.

Terminology

Throughout the specification, the following terms have the meanings provided herein, unless the context clearly dictates otherwise. The terms "a grid point" and "a grid location" are used interchangeably to refer to a grid point in a grid map. The terms "a query point" and "a query location" are used interchangeably to refer to a location in a pattern layout where an intensity value is evaluated.

Optical Proximity Correction (OPC)

During an OPC process, the mask layout polygons are typically "dissected" into small movable segments, which are simulated at one or more image evaluation points to predict the error between the expected wafer pattern and the target (input) wafer pattern for that segment (i.e., the edge error). The simulation convolves spatial kernel functions with the physical mask layout to calculate the aerial image on the wafer at the segment. The aerial image is then translated into a prediction for the final wafer pattern edge. The segment location is then adjusted based on the error amount between the design target and the predicted wafer pattern edge at the image evaluation point(s). All segments in a design layout are simulated and adjusted in both local and global iterations to optimize the mask layout to converge upon the desired wafer pattern.

Embodiments of the present invention can be applied to an OPC process to improve the simulation accuracy and efficiency. Furthermore, the applications of the present invention can also include, but are not limited to, resolution enhancement technology (RET), a lithography verification process, a wafer-image generation process, and other optical lithography simulation processes. Hence, although the present invention may be described in the context of an OPC process below, the general techniques of the present invention are not meant to be limited to an OPC process.

A Flash-based Convolution Technique

Figure 2:
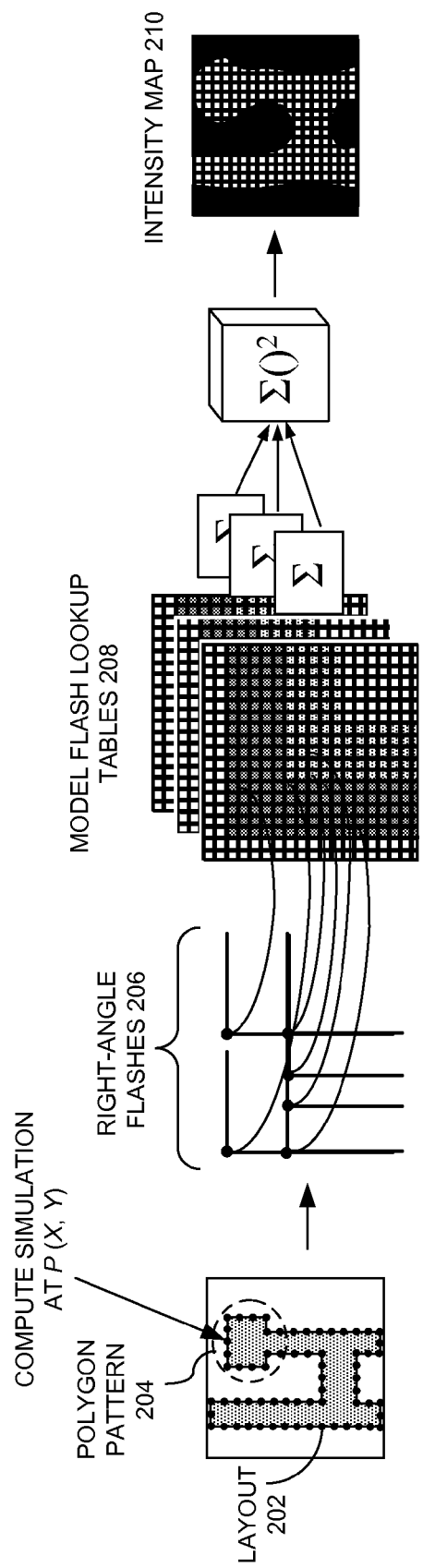
FIG. 2 illustrates the process of applying a flash-based simulation technique to an optical lithography simulation process.

FIG. 2 illustrates the process of applying a flash-based simulation technique to an optical lithography simulation process. Specifically, the flash-based technique is used to compute two-dimensional convolution values for a plurality of query points (i.e., the filled dots) on the edges of a pattern layout 202. Note that a specific query point P(x, y) is located on a polygon pattern 204, which is part of pattern layout 202.

Note that the flash-based technique precomputes (through numerical integration) the convolutions of a set of basis functions with one or more model kernels that represents the optical lithography system behavior. In particular, the set of basis functions are a set of half-plane basis functions that correspond to a set of predetermined face angles (e.g., a 45° face angle, a 90° face angle, a 135° face angle, etc). Note that each of the half-plane basis functions divides a two-dimensional space into two regions. The convolution values evaluated at an array of predetermined pixel locations are then stored in a set of two-dimensional lookup tables, referred to as model flash lookup tables. Note that FIG. 2 illustrates a set of model flash lookup tables 208.

More specifically, during the simulation process, the system decomposes polygon pattern 204 into a set of "flashes" where each of the flashes is an instance of the set of half-plane basis functions. As shown in FIG. 2, polygon pattern 204 is decomposed into six right-angle flashes 206, wherein each of the six filled dots indicates the corner of a right-angle flash. Note that flashes 206 are associated with a same basis function but different weights (+1 or −1) and different offsets (i.e., offset $(u_i, v_i)$). Next, for each of the model kernels, the system looks up a set of stored precomputed convolution values corresponding to query point P(x, y) in model flash lookup tables 208 for the set of flashes. Note that because the set of flashes 206 is associated with the same basis function, the convolution values for the set of flashes can be retrieved from the same lookup table (by considering the proper offsets). The system then computes the convolution value for a given query point P(x, y) for each model kernel by summing up the corresponding set of retrieved values. Similarly, the system repeats the above-described steps for all the other query points on layout 202. Finally, the system can compute an intensity map (i.e., an aerial image on the wafer) 210 for the entire layout 202 by performing a pixel-wise sum-of-squares operation over the set of model kernels for a regular grid of points within the region spanned by layout 202.

Field-Based Lithography Simulation

Figure 3:
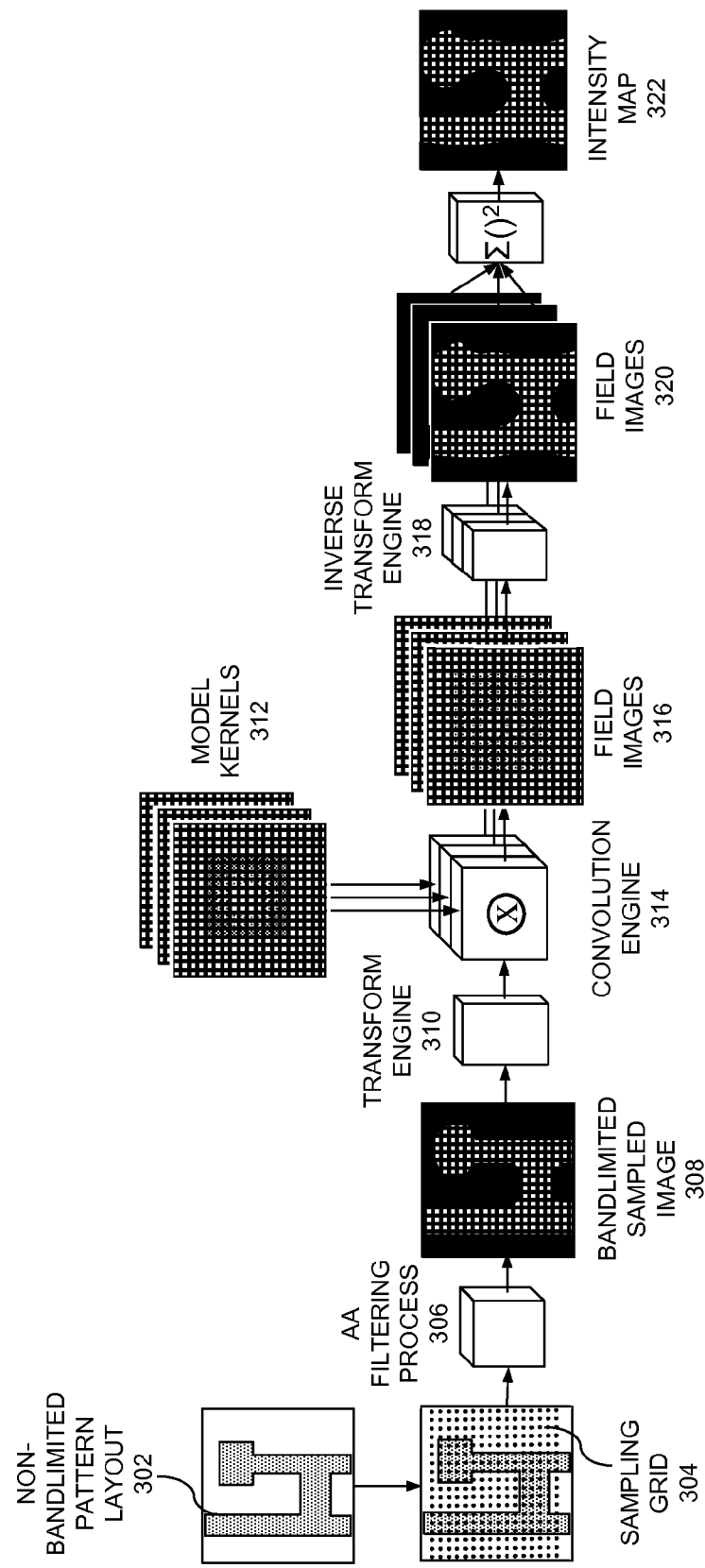
FIG. 3 illustrates the process of applying a field-based simulation technique to an optical lithography process.

FIG. 3 illustrates the process of applying a field-based simulation technique to an optical lithography process. Specifically, the system receives a 2D pattern layout 302 as input to the lithography system. In one embodiment of the present invention, pattern layout 302 is a non-bandlimited image that comprises spatial frequencies above the spatial bandwidth required by the simulation.

Next, the system establishes a sampling grid 304 comprising an array of simulation points, or pixels, on pattern layout 302. Specifically, sampling grid 304 may be sufficiently dense so that using a DFT-based convolution technique can be more efficient than using the flash-based convolution technique described above. Note that the grid spacing can be determined by the spatial bandwidth requirement of the simulation. Also note that the sampled pattern layout is still a non-bandlimited image.

As shown in FIG. 3, sampled pattern layout 304 is the input to an anti-aliasing filtering process 306. Anti-aliasing (AA) filtering process 306 typically uses one AA filter to convert the non-bandlimited input image into a bandlimited-sampled image 308. Specifically, the AA filter can be represented by an AA filter (AAF) kernel. The AAF kernel may be a function of: the sample spacing of the image grid, the cutoff frequency, and the spatial extent of the AAF kernel, among others. Note that a different AAF kernel may be needed for a different process model (e.g., on a different input layer or a different process node).

In one existing technique that implements AA filtering process 306, each pixel in the sampling grid 304 is further sampled into a finer grid by way of a "subresolution-pixel" sampling, thereby rendering the input image into a high-density pixel grid. Next, a finite impulse response (FIR) filter is used to "sample" the high-density pixel grid and convert it back to the intended lower-density simulation grid similar to sample grid 304. The FIR filtering operation removes high spatial frequency components and generates bandlimited-sampled image 308, which is typically a gray scale image. Note that to achieve the required accuracy for lithography simulation, the density of the subresolution rendering grid can be enormous; hence, the AA filtering based on sub-pixel sampling can be extremely computationally intensive.

Bandlimited-sampled image 308 is the input to spatial frequency domain (frequency domain hereafter) transform engine 310. Note that transform engine 310 can be configured to perform a fast Fourier transform (FFT). In other embodiments, other transform techniques can be used by transform engine 310. For example, these transforms can include, but are not limited to, a Laplace transform, a discrete Fourier transform, a Z-transform, and any other transform technique now known or later developed.

The frequency domain representation of the sampled image 308 is then convolved with a set of lithography model kernels 312 (which represents the lithographic behavior of the lithography system) by a convolution engine 314. Lithography model kernels 312 can be created using any conventional model-kernel-generation technique. Note that prior to convolving with the FFTed sampled image in the frequency domain, the model kernels are transformed into the frequency domain using an FFT. Also note that convolution engine 314 convolves the sampled image with each of the model kernels in one unified operation for the entire grid of the sample image.

The convolved output from convolution engine 314 comprises a set of field images 316 in the frequency domain corresponding to each of the model kernels 312. Field images 316 are the inputs to an inverse transform engine 318, which converts the field images from the frequency domain back to the spatial domain. Inverse transform engine 318 can perform an inverse FFT (IFFT) if transform engine 310 uses an FFT. The output of inverse transform engine 318 comprises a set of field images 320 in the spatial domain, wherein each field image corresponds to a model kernel 312. To obtain the final intensity map 322, the set of field images 320 is first squared at each pixel location. The corresponding pixel locations in the set of "squared" field images are then summed together to obtain intensity map 322, which represents the printed image on the wafer. Note that without incorporating OPC in the input layout, intensity map 322 is a distorted version of the desired pattern layout 302. Also note that the squaring operation on field images 320 doubles the spatial frequency in each dimension, hence quadrupling the size of intensity map 322.

Applying Flash-Based Convolution Technique to AA Filtering Operation

Referring to FIG. 3, note that the AA filtering process 306 converts the non-bandlimited pattern layout 302 into a band-limited sampled image 308. In one embodiment of the present invention, instead of using the above-mentioned sub-pixel sampling/FIR sampling technique, the AA filtering process 306 is implemented using a flash-based technique.

Figure 4:
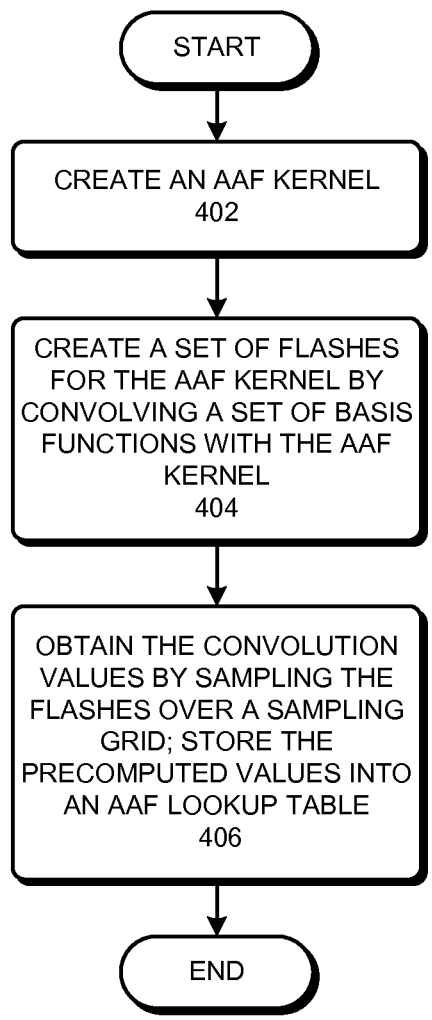
FIG. 4 presents a flowchart illustrating the process of building a library of AAF flash kernel in accordance with an embodiment of the present invention.

Note that a flash-based technique involves a library setup process. FIG. 4 presents a flowchart illustrating the process of building a library of AAF flash kernels in accordance with an embodiment of the present invention. During operation, the system creates an optimized AAF kernel (step 402). Note that this AAF kernel may be a function of sampling spacing of the image grid, a cut-off frequency for the AA filter, and spatial extent of the AAF kernel. In one embodiment of the present invention, a different AAF kernel is created for a different simulation job. The system then creates a set of flashes (i.e., convolution functions) for the AAF kernel by convolving a set of basis functions with the AAF kernel (step 404). Note that step 404 is described in more detail in the above-referenced patents. Next, the system obtains the convolution values by sampling the flashes over a sampling grid and subsequently stores the precomputed values into an AAF lookup table (step 406). Note that step 406 is also described in detail in the above-referenced patents. In one embodiment of the present invention, the AAF lookup table is a 2D table indexed by x and y coordinates.

Figure 5:
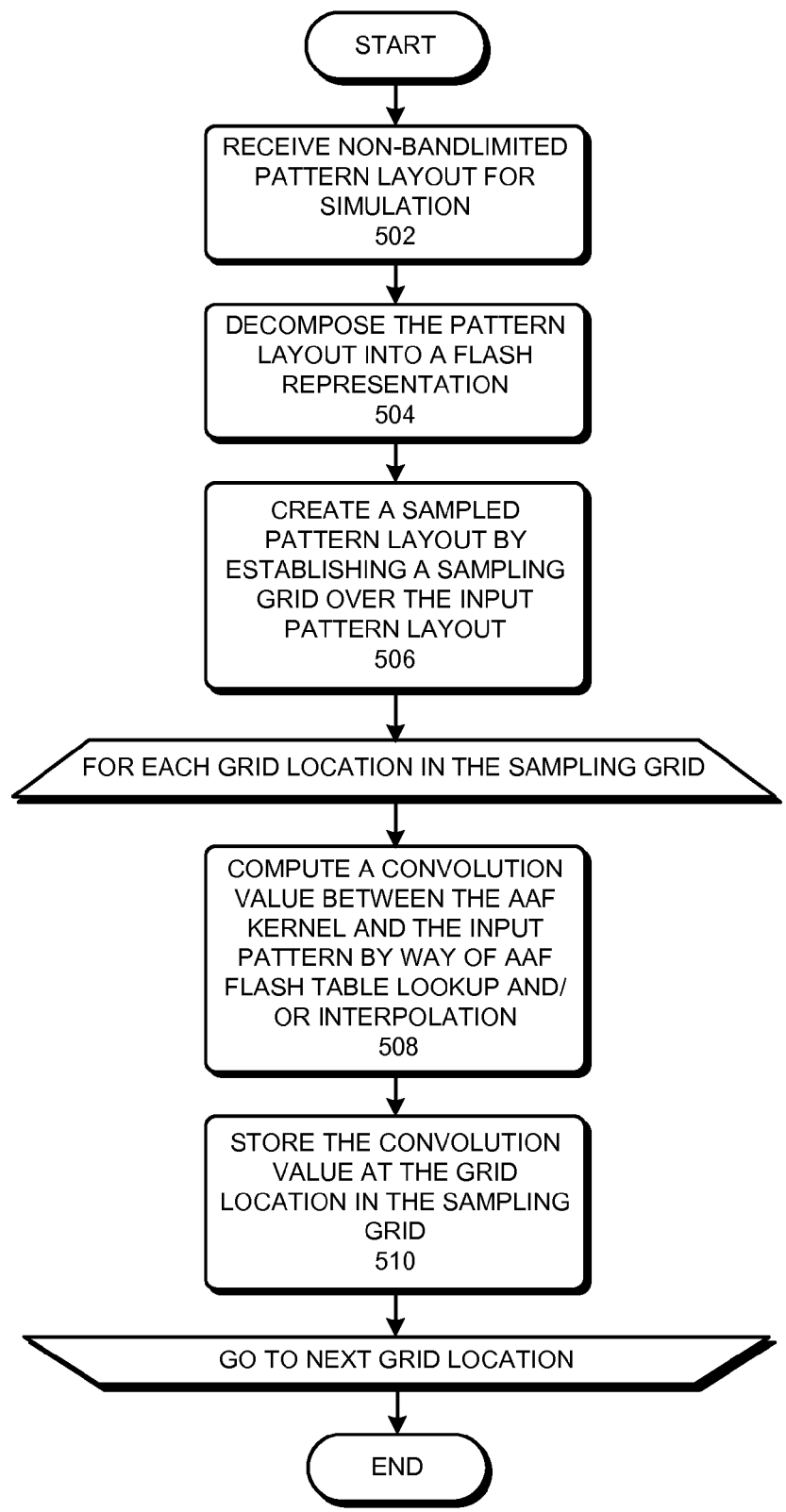
FIG. 5 presents a flowchart illustrating the process of using a flash-based technique to perform the AA filtering operation in FIG. 3 in accordance with an embodiment of the present invention.

FIG. 5 presents a flowchart illustrating the process of using a flash-based technique to perform the AA filtering operation in FIG. 3 in accordance with an embodiment of the present invention.

During operation, the system receives a non-bandlimited pattern layout for simulation, for example, non-bandlimited pattern layout 302 in FIG. 3 (step 502). Note that non-bandlimited pattern layout 302 comprises a set of polygons. Next, the system decomposes pattern layout 302 into a flash representation, wherein each flash in the flash representation is an instance of one of the set of basis functions (step 504). The system then creates a sampled pattern layout by establishing a sampling grid over the non-bandlimited pattern layout (step 506). Note that this sampling grid may be different from the sampling grid associated with the AAF lookup table. Next, at each grid location in the sampling grid, the system computes a convolution value (i.e., a filtered value) between the AAF kernel and the input pattern layout by way of AAF flash table lookup (step 508). Step 508 is described in more detail in conjunction with FIG. 6. The system subsequently stores the convolution value at the grid location in the sampling grid (step 510). Note that the system repeats steps 508 and 510 for the entire sampling grid to obtain a band-limited sampled image, such as band-limited sampled image 308.

Figure 6:
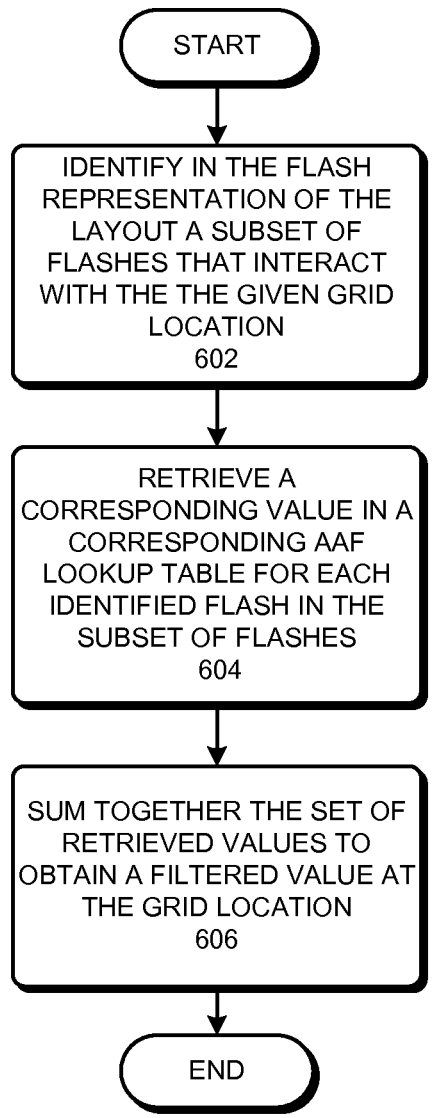
FIG. 6 presents a flowchart illustrating the process of using the AAF lookup tables to obtain a filtered value at a grid location in accordance with an embodiment of the present invention.

FIG. 6 presents a flowchart illustrating the process of using the AAF lookup tables to obtain a filtered value at a grid location in accordance with an embodiment of the present invention.

Prior to generating the filtered values for the grid points, all polygons in the layout are decomposed into a set of flashes. Note that flashes that are associated with a same basis function can have different weights (+1 or −1) and different offsets (i.e., offset $(u_i, v_i)$). During operation, the system identifies, from the flash representation of the layout, a subset of flashes that interact with the grid location (step 602). The system then retrieves a corresponding value in a corresponding AAF lookup table for each identified flash in the subset of flashes (step 604). In one embodiment of the present invention, if the grid location does not match any stored flash location in the lookup table, the system interpolates a value for the grid location based on the offset $(u_i, v_i)$ determined from the relative positions of the grid location and each flash location. Next, the system sums together the set of retrieved values to obtain a filtered value at the grid location (step 606).

Note that when the grid locations do not exactly match the sampled locations in the AAF lookup table, embodiments of the present invention can use interpolation techniques to evaluate the convolution value for these grid locations based on the precomputed convolution values stored on the surrounding locations.

Note that the above-described flash-based AA filtering technique also creates a band-limited gray-scale image. While a field-based technique using sub-pixel sampling may be an effective approach for filtering arbitrarily shaped and shaded images, IC design layouts are typically highly constrained (i.e., polygons with restricted vertex angles, no shading). Hence, using a flash-based filtering technique for those constrained shapes can provide significantly higher computational efficiency and accuracy (through a reduced noise level).

In one embodiment of the present invention, the flash-based AA filtering technique in conjunction with FIGS. 4-6 is incorporated into the field-based lithography simulation process as depicted in FIG. 3.

Flash-Based Fast Image Perturbation

Figure 7:
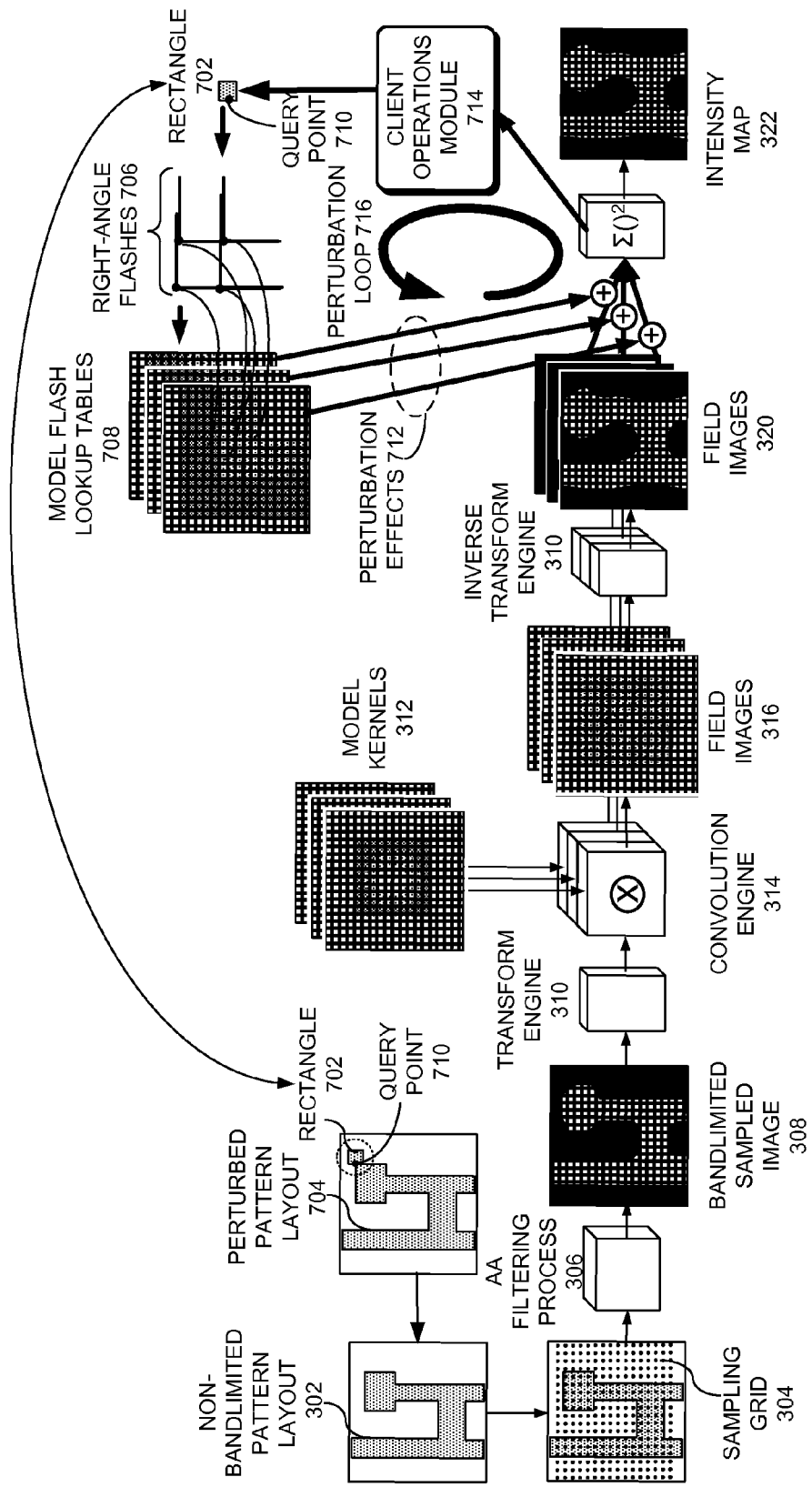
FIG. 7 illustrates the process of perturbing an existing pattern layout in a field-based optical lithography simulation in accordance with an embodiment of the present invention.

We refer to the process of making one or more minor changes or modifications to an existing pattern layout as an "image perturbation" to the pattern layout. FIG. 7 illustrates the process of perturbing an existing pattern layout in a field-based optical lithography simulation in accordance with an embodiment of the present invention. Note that FIG. 7 shows substantially the same process flow as FIG. 3. Specifically, input pattern layout 302 produces an intensity map 322 through frequency domain transformations and convolutions.

Suppose a small rectangular shape 702 is added to pattern layout 302 as illustrated in perturbed pattern layout 704. Because the field-based simulation uses the DFT to compute the transform of an image map in one unified operation, any change made to the input layout, regardless how minor, would typically require repeating the DFT operation on the entire perturbed layout 704. Hence, the existing technique repeats the entire process flow described in conjunction with FIG. 3 to compute a new intensity map for perturbed pattern layout 704. Unfortunately, optical lithography simulations, in particular OPC operations, rely heavily on the ability to incrementally adjust an existing layout to simulate the effect of a minor modification to a pattern layout. Consequently, recomputing the DFT for the majority of the original layout to assess each image perturbation is very inefficient and highly undesirable.

One embodiment of the present invention provides a flash-based image perturbation technique which avoids repeating most of the steps in FIG. 3 to evaluate the results of minor adjustments to an input layout.

Figure 8:
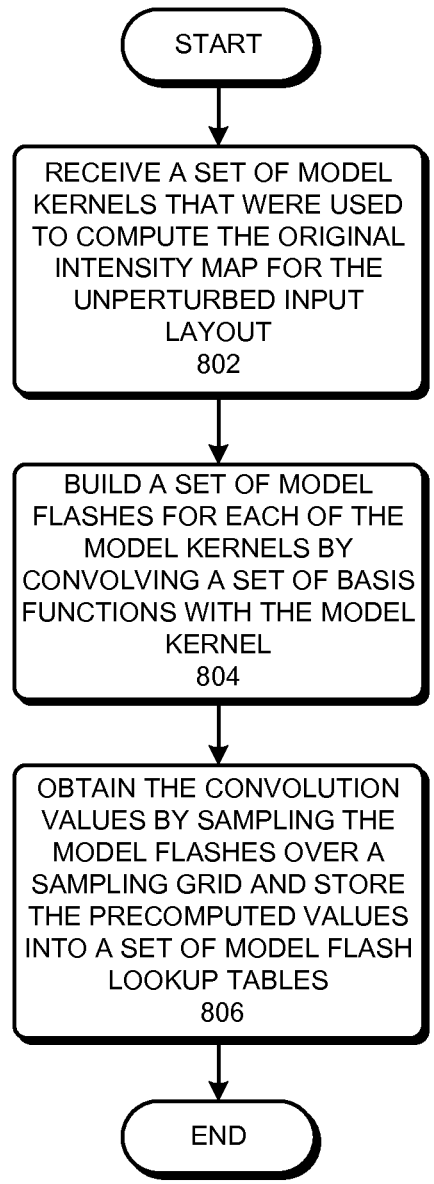
FIG. 8 presents a flowchart illustrating the process of constructing a set of model flash lookup tables in accordance with an embodiment of the present invention.

Similar to the flash-based AA filtering, a flash-based image perturbation technique typically involves a library setup process. FIG. 8 presents a flowchart illustrating the process of constructing a set of model flash lookup tables in accordance with an embodiment of the present invention.

During operation, the system receives the same set of lithography model kernels (model kernels hereafter) that were used to compute the original intensity map for the unperturbed input layout (step 802). The system then builds a set of model flashes for each of the model kernels by convolving a set of basis functions with the model kernel (step 804). Note that step 804 is described in more detail in the above-referenced patents. Next, the system obtains the convolution values by sampling the model flashes over a sampling grid and subsequently stores the precomputed values into model flash lookup tables (step 806). Note that step 806 is also described in detail in the above-referenced patents. In one embodiment of the present invention, each model flash lookup table is a 2D table indexed by x and y coordinates.

Note that during an image perturbation process, the perturbation effect is typically evaluated at one or a few query points. We are interested in how the perturbation pattern affects the intensity value at each of the query points.

Figure 9:
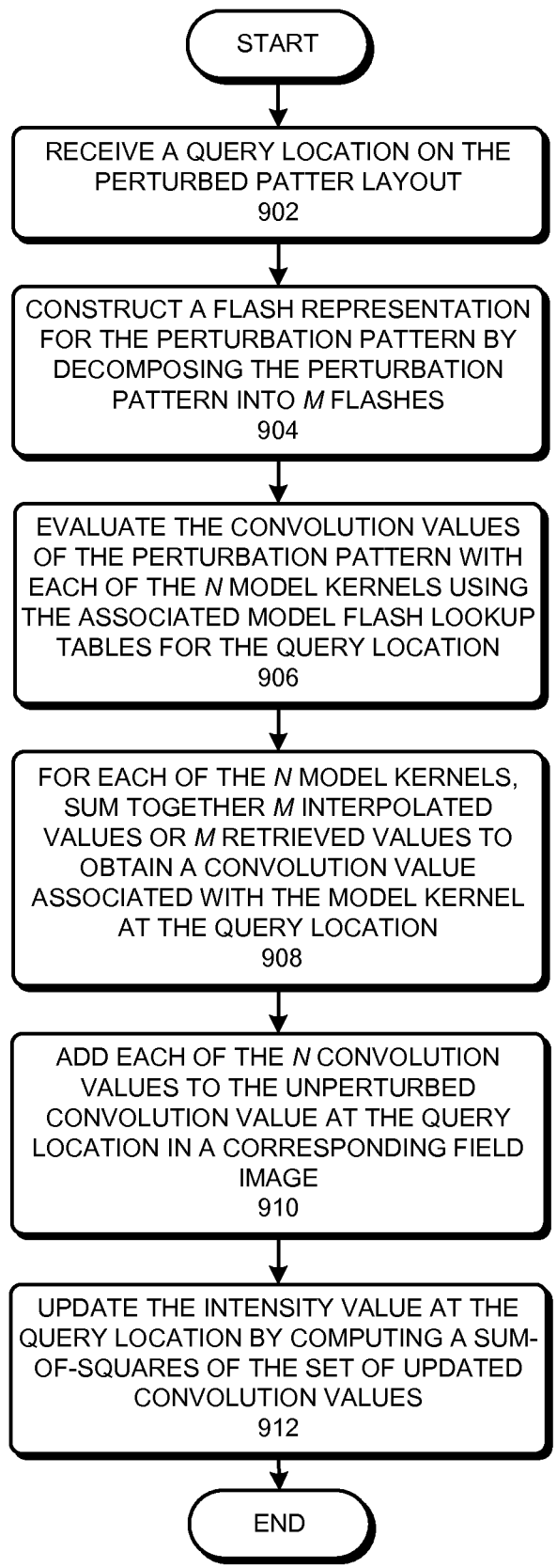
FIG. 9 presents a flowchart illustrating the process of using the model flash lookup tables to evaluate the effect of a perturbation pattern on a given query point in accordance with an embodiment of the present invention.

FIG. 9 presents a flowchart illustrating the process of using the model flash lookup tables to evaluate the effect of a perturbation pattern on a given query location in accordance with an embodiment of the present invention.

During operation, the system receives a query location Q on the perturbed pattern layout (step 902). Referring to FIG. 7, query location Q can be query point 710 on perturbed pattern layout 704. Note that although query point 710 is also on rectangle 702, generally query location Q does not need to be on the perturbation pattern.

In one embodiment of the present invention, an unperturbed intensity value at query location Q has been obtained separately prior to the perturbation process. Note that a given query point may or may not coincide (align) with a field-based grid point. If they happen to coincide, the unperturbed intensity value can be obtained directly from the intensity map.

In most of the cases however, query location Q not coincide with any grid point in the intensity map. Hence, to obtain the unperturbed intensity value, one embodiment of the present invention interpolates a value for query location Q. Specifically, this interpolation may involve interpolating a value in each of the field images (e.g., field images 320); squaring each value; and summing all the values together. Additionally, the system also saves the interpolated values for query location Q for each of the field images.

Referring back to FIG. 9, the system next constructs a flash representation for the perturbation pattern by decomposing the perturbation pattern into M flashes $f_i$ ($1 \leq i \leq M$), wherein each flash $f_i$ is an instance of one of the set of basis functions used to build the set of model flashes (step 904). For example in FIG. 7, rectangle 702 is decomposed into four right-angle flashes 706, wherein each of the four filled dots indicates the corner of a right-angle flash. Note that these flashes are associated with the same basis function but with different weights (+1 or −1) and different offsets (i.e., offset ($u_i$, $v_i$)) in the perturbed pattern layout 704. Hence, they are different flashes.

Next, for query location Q, the system evaluates the convolution values of the perturbation pattern with each of the N model kernels $k_j$ ($1 \leq j \leq N$) using the associated model flash lookup tables (step 906). Referring to FIG. 7, a set of model flash lookup tables 708 is used to look up and retrieve convolution values at query point 710 with each of model kernels 312.

Note that in many cases, query location Q does not coincide with a sampling grid point in the model flash lookup tables. In such cases, embodiments of the present invention use interpolation techniques to evaluate the convolution values for the query location based on the flash table values stored at the surrounding pixels. In one embodiment of the present invention, prior to sampling the numerically integrated flash function into a model flash lookup table, the system stores in the flash lookup table the coefficients for a 9th order polynomial computed in a separate modeling process. During a flash-based perturbation process, these coefficients are used to interpolate between table values of pixels surrounding query location Q to obtain an intermediate value for query location Q. Note that for each model kernel $k_j$ ($1 \leq j \leq N$), the system interpolates M convolution values for the set of M flashes.

If query location Q happens to coincide with a sampling grid point in the model flash lookup tables, then for each model kernel $k_j$, the system retrieves a set of M precomputed values in the corresponding model flash lookup table corresponding to the M flashes.

Next, for each model kernel $k_j$, the system sums together the M interpolated values or M retrieved precomputed values to obtain a convolution value associated with model kernel $k_j$, at query location Q (step 908). Consequently, the system obtains N convolution values for the N model kernels at the query location.

The system then adds each of the N convolution values to the unperturbed convolution value at query location Q in a corresponding field image (step 910). In one embodiment, each of the N convolution values is added to a corresponding interpolated convolution value (that was used to compute the unperturbed intensity value) at query location Q in a corresponding field image. Note that this step effectively superposes the convolution effect from the perturbation pattern onto the original field images from the unperturbed pattern layout. Specifically, the superposition is separately performed for each of the model kernels. This is also illustrated in FIG. 7 wherein the computed perturbation effects 712 from rectangle 702 associated with each model kernel 312 is added onto each of corresponding field images 320 (at the query location). Note that embodiments of the present invention do not recompute field images 320 for the original pattern layout 302.

Finally, the system obtains an updated intensity value at query location Q by computing a sum-of-squares of the set of updated convolution values in the set of field images (step 912). Note that the updated intensity value includes the effect of the perturbation pattern.

Note that if there is more than one query location, the system repeats steps 902-910 for each additional query location. Also note that during the intensity updating process, the system only has to perform a sum-of-squares operation over the set of updated field images for a small number of query points associated with the perturbed pattern layout.

Fast Perturbation Loop for OPC

An efficient OPC process depends on the ability to rapidly make small adjustments around an evaluation point on the mask layout based on the difference between the design target (i.e., a threshold value) and the simulated intensity map at the evaluation point. Such an OPC process typically involves an iterative loop that increasingly brings the simulation result toward the target value.

In one embodiment of the present invention, the flash-based image perturbation technique facilitates creating a highly efficient OPC loop, referred to as a fast perturbation loop. One embodiment of this fast perturbation loop is illustrated in FIG. 7.

As shown in FIG. 7, an unperturbed set of field images 320 and intensity map 322 are initially obtained. Next, a perturbation pattern (rectangle 702) is applied to the original pattern layout 302. The system then evaluates the intensity value at a query location in the intensity map using the flash-based technique described in conjunction with FIG. 9, thereby generating an updated intensity value for the query location. Next, client operations module 714 compares the updated intensity value for the query location with a threshold intensity value required for the query location. Based on the difference between the updated value and the threshold value, client operations module 714 makes small adjustments to the perturbation pattern, i.e., rectangle 702. The system then reevaluates the effect of the new perturbation pattern on the intensity value at the query point using the flash-based technique described in conjunction with FIG. 9, thereby generating a new intensity value at the query location. The system repeats this procedure until an updated intensity value is above the threshold intensity value.

Note that the above-described perturbation loop 716 completely bypasses the computations involving the DFT, and does not require recomputing the field images 320 for the original pattern layout 302. Also note that although perturbation loop 716 includes the sum-of-squares operation, in each iteration the sum-of-squares operation only needs to be applied to one or a few query points associated with the perturbed pattern layout, but not to the entire field images 320.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining a band-limited pattern image from a non-band-limited pattern layout, the method comprising:

receiving the non-band-limited pattern layout;

receiving a filter kernel for determining the band-limited pattern image from the non-band-limited pattern layout;

constructing, by computer, a lookup table containing pre-computed values for a set of convolution functions, wherein each convolution function is a convolution of the filter kernel with a basis function in a set of basis functions; and determining the band-limited pattern image by convolving the filter kernel with the non-band-limited pattern layout using the lookup table.

2. The method of claim 1, wherein each basis function in the set of basis functions corresponds to a face angle in a set of face angles.

3. The method of claim 1, wherein the method comprises decomposing a polygon in the non-bandlimited pattern layout into a combination of basis functions from the set of basis functions.

4. The method of claim 1, wherein each pre-computed value is the value of a convolution function in the set of convolution functions at a sample point in a sampling grid.

5. The method of claim 1, wherein the lookup table is a two-dimensional table indexed by X and Y coordinates.

6. The method of claim 1, wherein the method further comprises convolving the band-limited pattern image with a set of lithography model kernels.

7. A non-transitory computer-readable storage medium storing instructions that when executed by a computer cause the computer to perform a method for determining a band-limited pattern image from a non-band-limited pattern layout, the method comprising:

receiving the non-band-limited pattern layout;

receiving a filter kernel for determining the band-limited pattern image from the non-band-limited pattern layout;

constructing a lookup table containing pre-computed values for a set of convolution functions, wherein each convolution function is a convolution of the filter kernel with a basis function in a set of basis functions; and determining the band-limited pattern image by convolving the filter kernel with the non-band-limited pattern layout using the lookup table.

8. The non-transitory computer-readable storage medium of claim 7, wherein each basis function in the set of basis functions corresponds to a face angle in a set of face angles.

9. The non-transitory computer-readable storage medium of claim 7, wherein the method comprises decomposing a polygon in the non-bandlimited pattern layout into a combination of basis functions from the set of basis functions.

10. The non-transitory computer-readable storage medium of claim 7, wherein each pre-computed value is the value of a convolution function in the set of convolution functions at a sample point in a sampling grid.

11. The non-transitory computer-readable storage medium of claim 7, wherein the lookup table is a two-dimensional table indexed by X and Y coordinates.

12. The non-transitory computer-readable storage medium of claim 7, wherein the method further comprises convolving the band-limited pattern image with a set of lithography model kernels.

13. An apparatus for determining a band-limited pattern image from a non-band-limited pattern layout, the apparatus comprising:

a receiving mechanism configured to receive:

the non-band-limited pattern layout, and a filter kernel for determining the band-limited pattern image from the non-band-limited pattern layout;

a constructing mechanism configured to construct a lookup table containing pre-computed values for a set of convolution functions, wherein each convolution function is a convolution of the filter kernel with a basis function in a set of basis functions; and a determining mechanism configured to determine the band-limited pattern image by convolving the filter kernel with the non-band-limited pattern layout using the lookup table.

14. The apparatus of claim 13, wherein each basis function in the set of basis functions corresponds to a face angle in a set of face angles.

15. The apparatus of claim 13, comprising a decomposing mechanism configured to decompose a polygon in the non-bandlimited pattern layout into a combination of basis functions from the set of basis functions.

16. The apparatus of claim 13, wherein each pre-computed value is the value of a convolution function in the set of convolution functions at a sample point in a sampling grid.

17. The apparatus of claim 13, wherein the lookup table is a two-dimensional table indexed by X and Y coordinates.

18. The apparatus of claim 13, wherein the determining mechanism is configured to convolve the band-limited pattern image with a set of lithography model kernels.

* * * * *